Mar. 20, 1923.
C. F. PEARSON.
CLUTCH.
FILED JULY 28, 1919.
1,448,860.
2 SHEETS—SHEET 1.
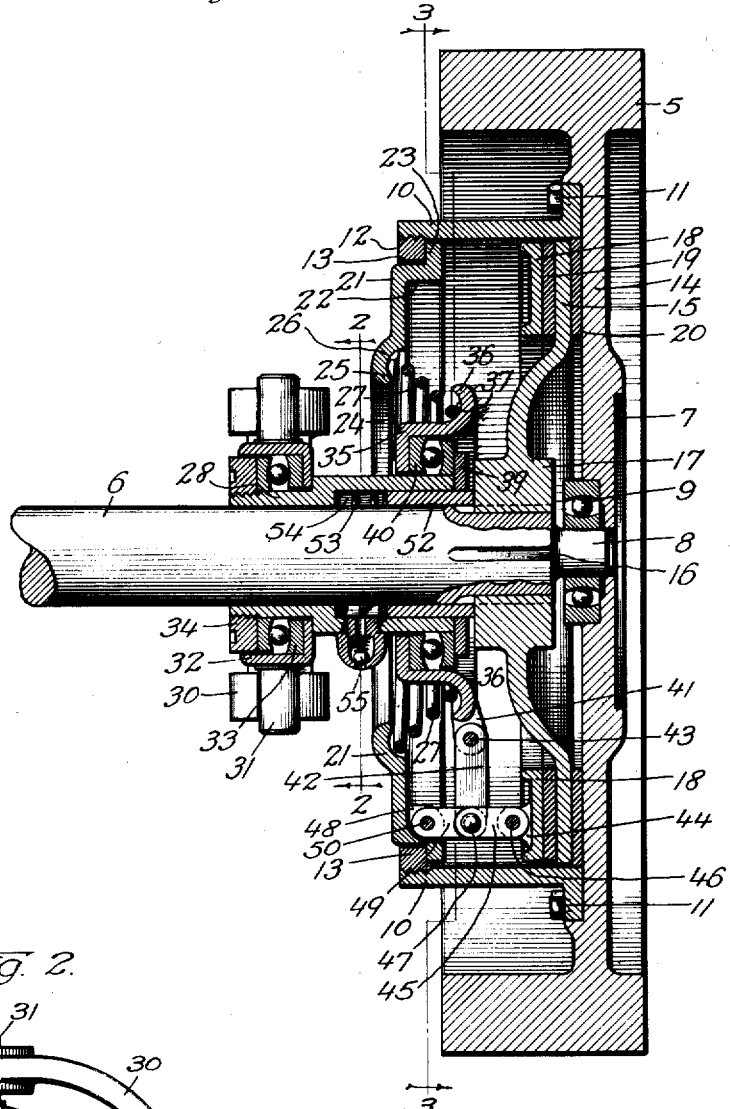
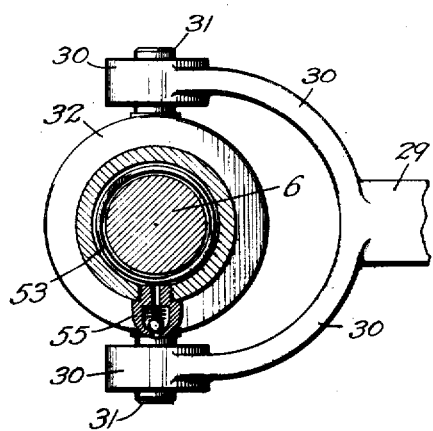

Patented Mar. 20, 1923.

1,448,860

UNITED STATES PATENT OFFICE.

CARL F. PEARSON, OF CHICAGO, ILLINOIS, ASSIGNOR TO CHICAGO MACHINE & MOTOR CO., OF CHICAGO, ILLINOIS, A CORPORATION OF ILLINOIS.

CLUTCH.

Application filed July 28, 1919. Serial No. 313,956.

*To all whom it may concern:*

Be it known that I, CARL F. PEARSON, a citizen of the United States, residing at Chicago, in the county of Cook and State of Illinois, have invented certain new and useful Improvements in Clutches, of which the following is a specification.

My invention relates to improvements in clutches and has especial reference to friction clutches.

One of the objects of the invention is generally to improve clutches, to increase their effectiveness, efficiency and reliability.

Another object is to provide means to prevent the clutch actuating means from bringing the clutch members too suddenly into engagement, while permitting them to become disengaged instantly. To provide means whereby to accurately and quickly adjust the clutch members, with reference to each other, so as to vary the pressure with which they are maintained and to compensate for wear of the parts and coincidentally adjust the tension of the spring which automatically moves said members into engagement and holds them in position into which they have been moved.

Other, further and more specific objects of the invention will become readily apparent to persons skilled in the art, from a consideration of the following description when taken in conjunction with the drawings, wherein:—

Fig. 1 is a diametric sectional view of the clutch.

Fig. 2 is a section taken on line 2—2 of Fig. 1.

In all the views the same reference characters are employed to indicate similar parts.

Figure 3:
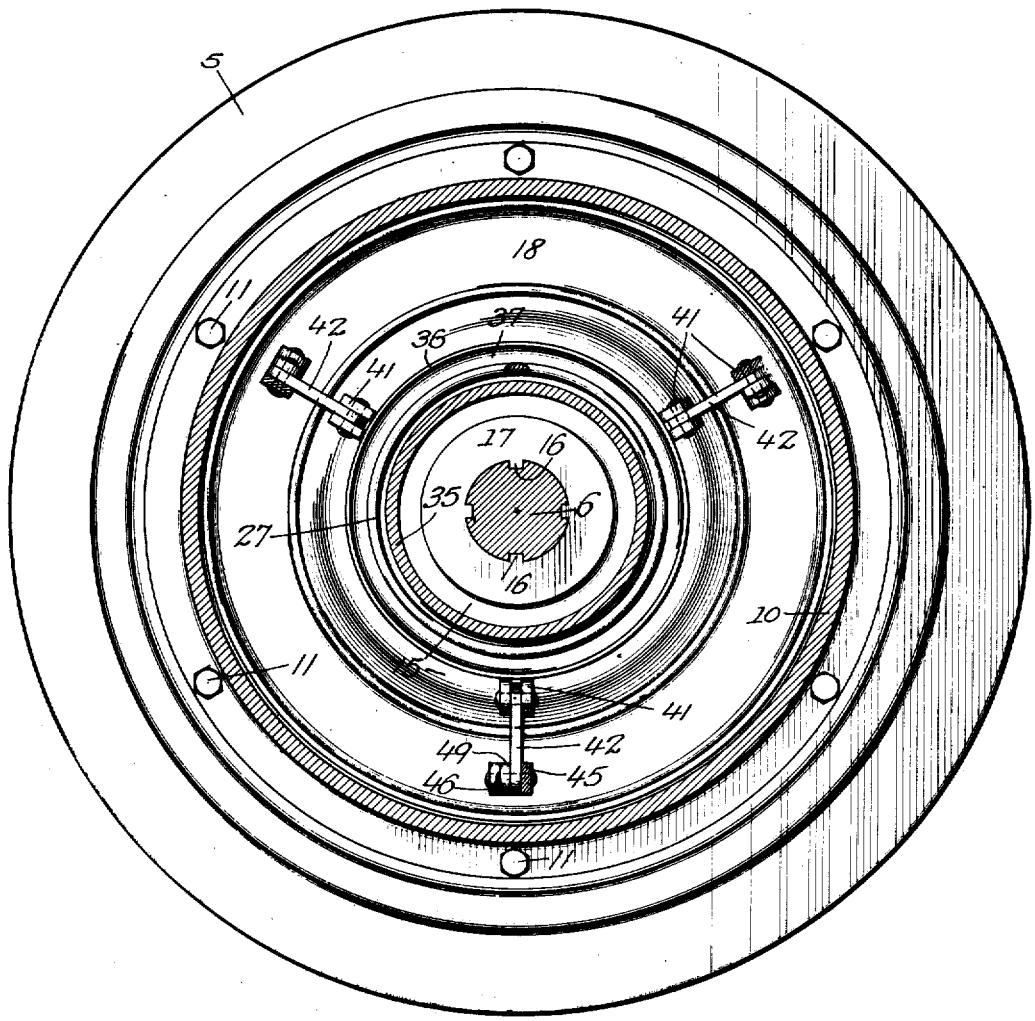
Fig. 3 is a section taken on line 3—3 of Fig. 1.

The clutch illustrated is of the type in which the clutch members are normally held in driving contact with each other by means of a spring and are disconnected by the application of power applied to a lever, or the like, for moving the clutch members apart against the resilient effect or yielding resistance of the spring and in which the members are automatically associated again in driving connection by the operation of the spring.

In many clutches of this general type, in which a spring moves the engaging clutch members into driving relation, when one of said members has been released, the engagement of the driven member with the driving member is thus produced too suddenly so that power is thrown onto the driven shaft so as to produce jumping or slipping of the clutch members and unnecessary strain and wear thereon.

In the operation of such devices, it is quite essential that the driven member should be brought more slowly into contact with the driving member so that the mechanism, controlled by the driven member, may be more gradually brought into motion.

In the structure specifically illustrated by the drawings, 5 is a fly wheel, which may be the driving member, connected by the clutch to the driven shaft 6. An engine shaft, or the like, may be connected to the fly wheel by a flange, to the surface 7 of the fly wheel. The end of the shaft 6 finds a step bearing, as at 8, in the fly wheel upon ball bearing 9, for the purpose of centering the two rotatable members and for reducing the friction therebetween. The inside of the fly wheel is provided with a relatively large annular rim 10, secured thereto by bolts 11, and internally threaded, as at 12, for a threaded adjusting ring 13. The web 14 of the fly wheel serves as one of the clutch members, preferably, the driving member, while the flat ring 15 is the driven member, secured to the shaft 6 by the key way construction 16. The ring 15 is an integral part of the hub 17. A loose ring 18 is axially movable, on the shaft 6, and operates to force the driving and driven members 14 and 15 into driving relation. Between the rings 15 and 18 may be introduced a ring 19 of fabric, or the like, and a similar ring 20 may be located between the driven ring 15 and the surface 14 of the driving member. These yielding rings or fabrics are used to equalize any little inequality of the surfaces of the driving and driven members, as usual in clutches of this general character. A disc 21, having an inturned part 22 and an outturned flange 23, is held to the rim 10 by the adjusting ring 13. The disc 21 is internally perforated, as at 24, and the edge bounding the perforation is inturned, as at 25, to provide a concave seat 26 for a spring 27. The reciprocatable sleeve 28 is mounted on the shaft 6 and is adapted to be reciprocated in one direction by a lever 29, which has arms 30 that are provided with forked ends for engagement with the projecting studs 31. The studs 31 project laterally from an annular ring 32, having an internal ball bearing 33, held in place by a threaded ring 34, that is threaded to the outer end of the sleeve 28. Over the inner end of the sleeve 28, and supported thereon, is a cup shaped member 35, having an outwardly curved flange 36 to provide a concave seat 37 for the spring 27. The sleeve 28 is provided with a head 39 and between the heads and the sleeve 35 is a ball bearing 40.

Now it will be manifest that when the lever 29 is moved outwardly from the pulley, along the shaft 6, the sleeve 28 is moved therewith against the resistance of the spring 27 and when the lever 29 is released the spring 27 will return the parts to their normal position, shown in the drawings.

Secured at three points about the outer surface 36 of the cup shaped member 35 are ears 41 projecting radially therefrom and each ear carries a toggle link 42 of a compound toggle, pivoted to the ear, as at 43. Secured to the ring 18, in proper locality, are the same number of ears 44 to which is pivoted a relatively short link 45, as at 46, the same being pivoted to the link 42, as at 47, and secured to the disc 21 are similar ears 48, to which is pivoted links 49, as at 50. When the toggle composed of the links 45 and 49 is closed, as shown in Fig. 1, the ring 18 is thereby pressed firmly into contact with the intervening members between it and the driving member 14 of the fly wheel 5, by the effect of the spring 27. Now when the arm 29 is moved outwardly so as to compress the spring 27 the cup shaped member 35 is moved with the sleeve 28, by the operation of the arm, and the links 42 of one toggle will break the other toggles, composed of the links 45 and 49, thereby permitting the ring 18 to move outwardly from the position shown, and thereby decreasing the pressure between the driving and driven elements of the clutch.

Located around the shaft 6 is a ring 52 inside of the inner and larger end of the sleeve 28. The ring 52 is loose on the shaft and a spring 53 is located in the space 54, unoccupied by the ring 52, to yieldingly hold the ring 52 in the position shown in Fig. 1. When the sleeve 28 is moved outwardly for the purpose of disconnecting the clutch members, the air within the space 54 is thus attenuated and therefore a check valve 55 is automatically opened to admit air within the space 54. The check valve 55 will open immediately and freely admit air into the space 54 without producing any retarding effect when the clutch members are being separated. Now when the lever 29 is released, the spring 27 will return the members to the closed position of the clutch and the air within the space 54 will, by movement of the sleeve 28 be compressed, retarding the inward movement of the sleeve 28 and slowing up the activity of the mechanism for forcibly bringing the driving and driven members of the clutch together. The air within the space 54 will gradually leak out, as it becomes compressed, thereby producing a retarding effect and causing the clutch members to be gradually and slowly brought into driving contact with each other.

While I have herein shown a single embodiment of my invention, for the purpose of clear disclosure, it will be manifest to persons skilled in the art, that considerable change in the configuration and arrangement of the parts is permissible within the scope of the appended claims.

Having described my invention, what I claim is:—

1. A clutch having in combination a flywheel; a clutch member thereon; a co-operating clutch member movable toward and from the flywheel member; a series of double toggles to force the clutch members together; a spring to operate the toggles to normally hold the clutch closed; a relatively stationary dash-pot member; another co-operating dash-pot member movable by the spring and arranged to retard the movement of the movable clutch member and a valve connected with the dash-pot adapted to automatically open to admit air thereinto when the clutch members are being separated and a spring within the dash-pot tending to separate the members thereof.

2. A clutch having a fly wheel; a clutch member thereon; a shaft; a clutch member slidable thereon co-operating with the clutch member on the fly wheel; a rim on the fly wheel; a ring threaded in the rim; a disk having a part within the rim abutting the threaded ring and having a central perforation with the edges of the perforation curved inwardly to provide a seat for a tapered helical spring; a manually slidable ring having its outer surface curved outwardly to provide a seat for the other end of said spring; toggle members connected to said slidable ring to close the clutch and an open helical compression spring seated in said curved portions of said disk and said ring to yieldingly hold the clutch closed.

In testimony whereof I hereunto subscribe my name.

CARL F. PEARSON.